March 12, 1963 K. F. JOHNSON ETAL 3,081,396
APPARATUS FOR FORMING AND WELDING
Filed Jan. 9, 1961 9 Sheets-Sheet 1

INVENTORS
K. F. JOHNSON
A. L. QUINLAN
B. L. WRIGHT
BY A.C. Schwarz, Jr.
ATTORNEY

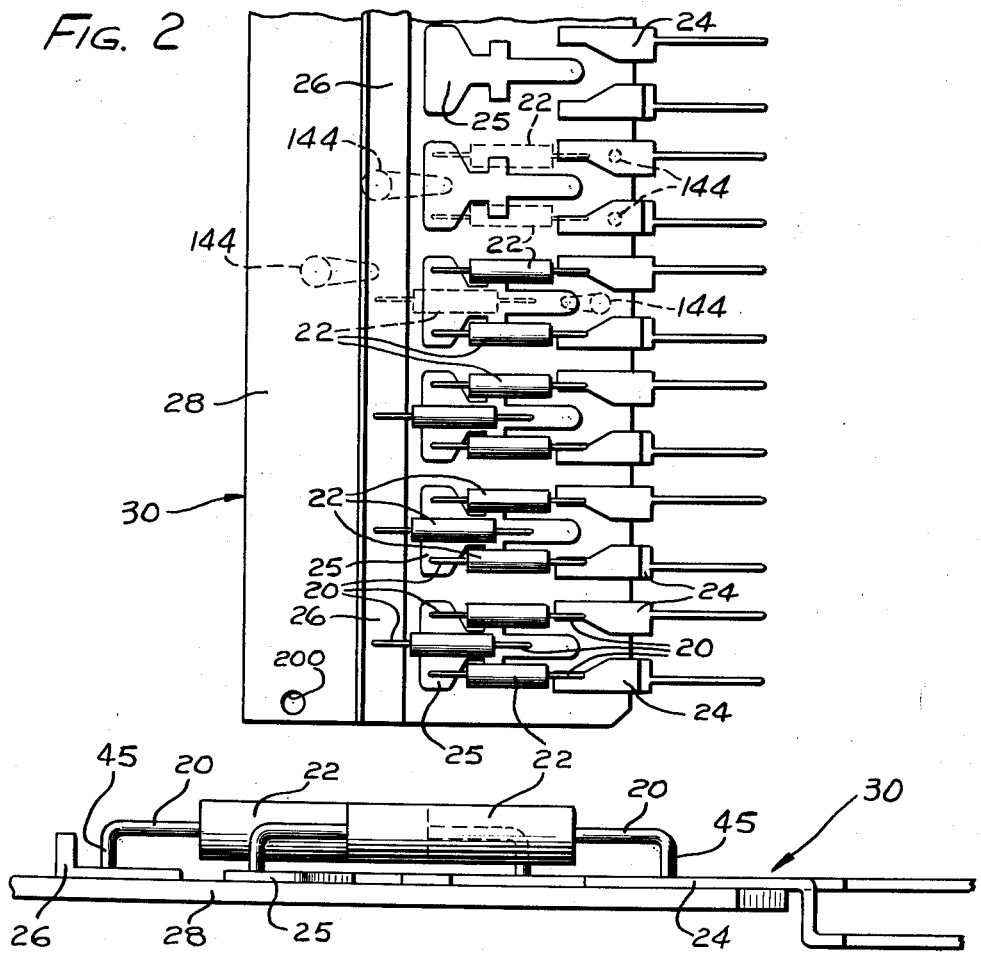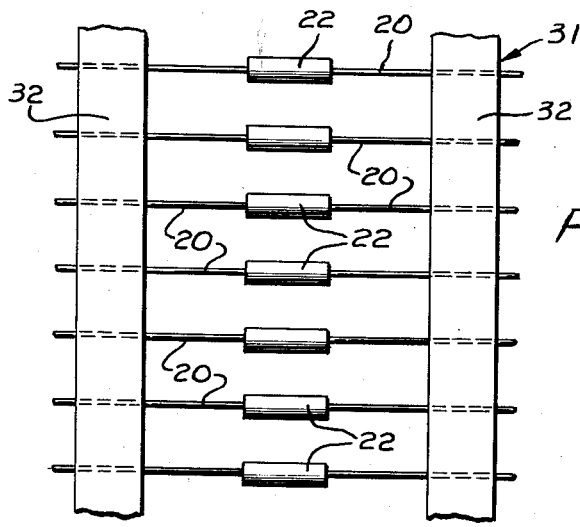

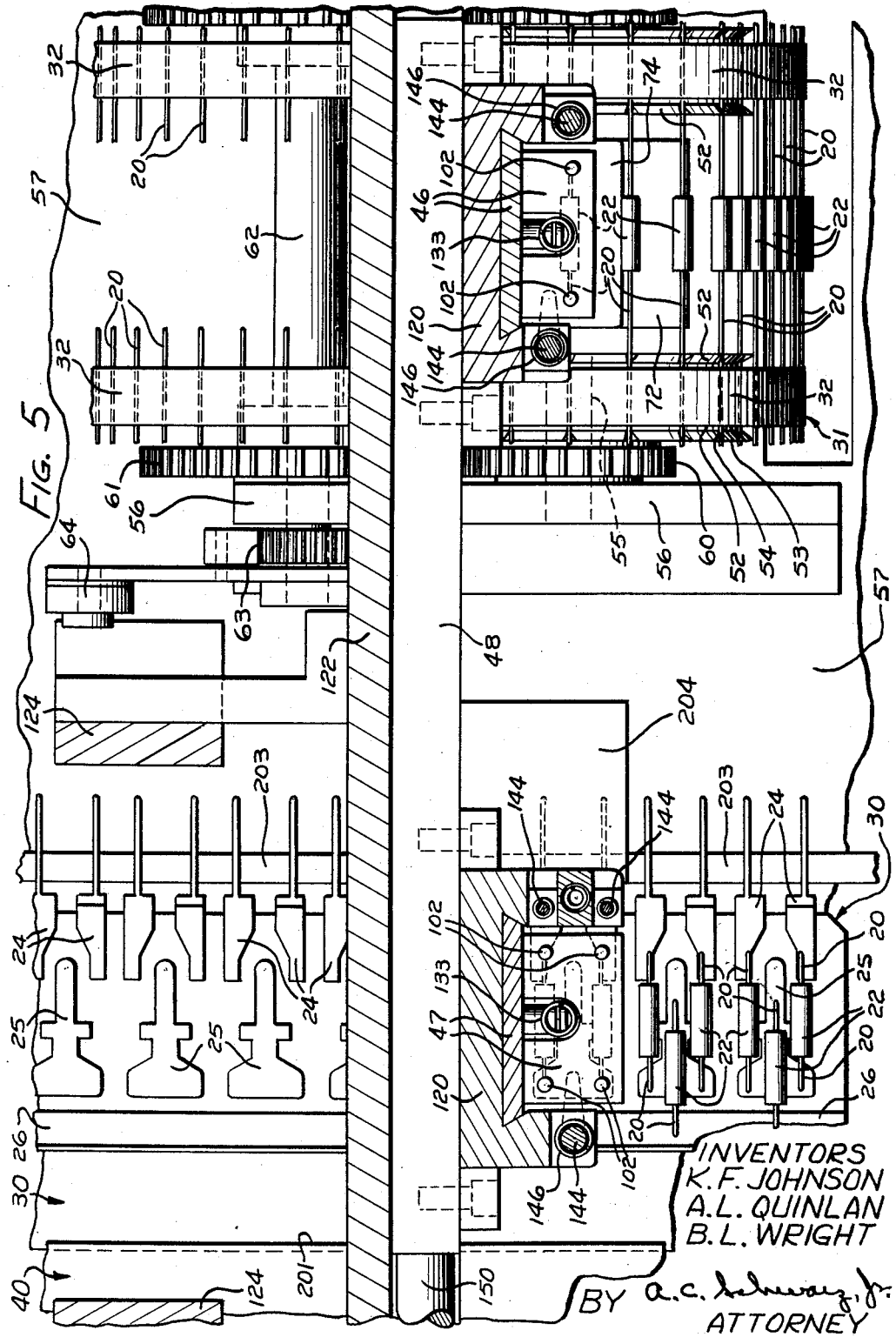

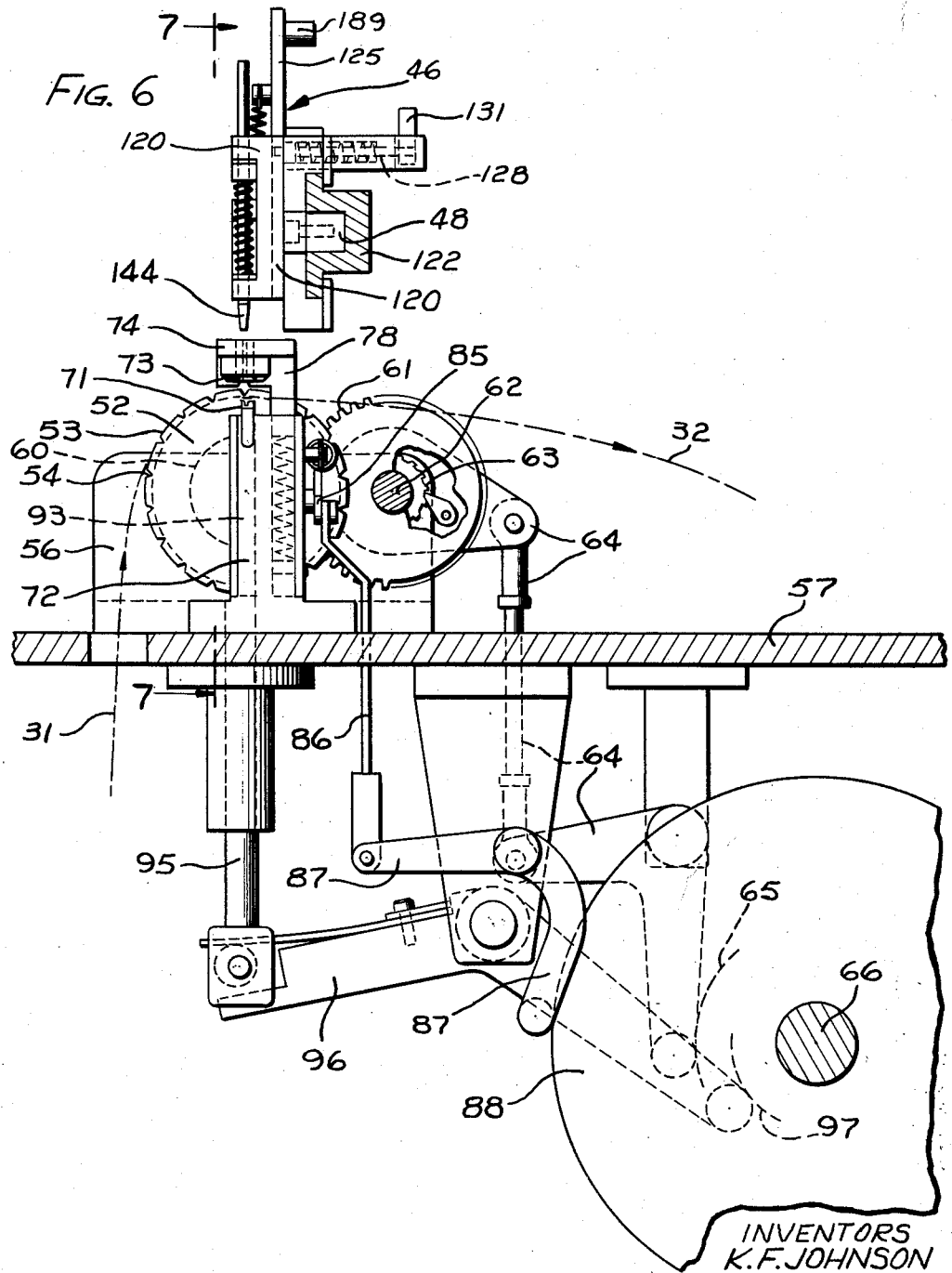

March 12, 1963  K. F. JOHNSON ETAL  3,081,396
APPARATUS FOR FORMING AND WELDING
Filed Jan. 9, 1961  9 Sheets-Sheet 5
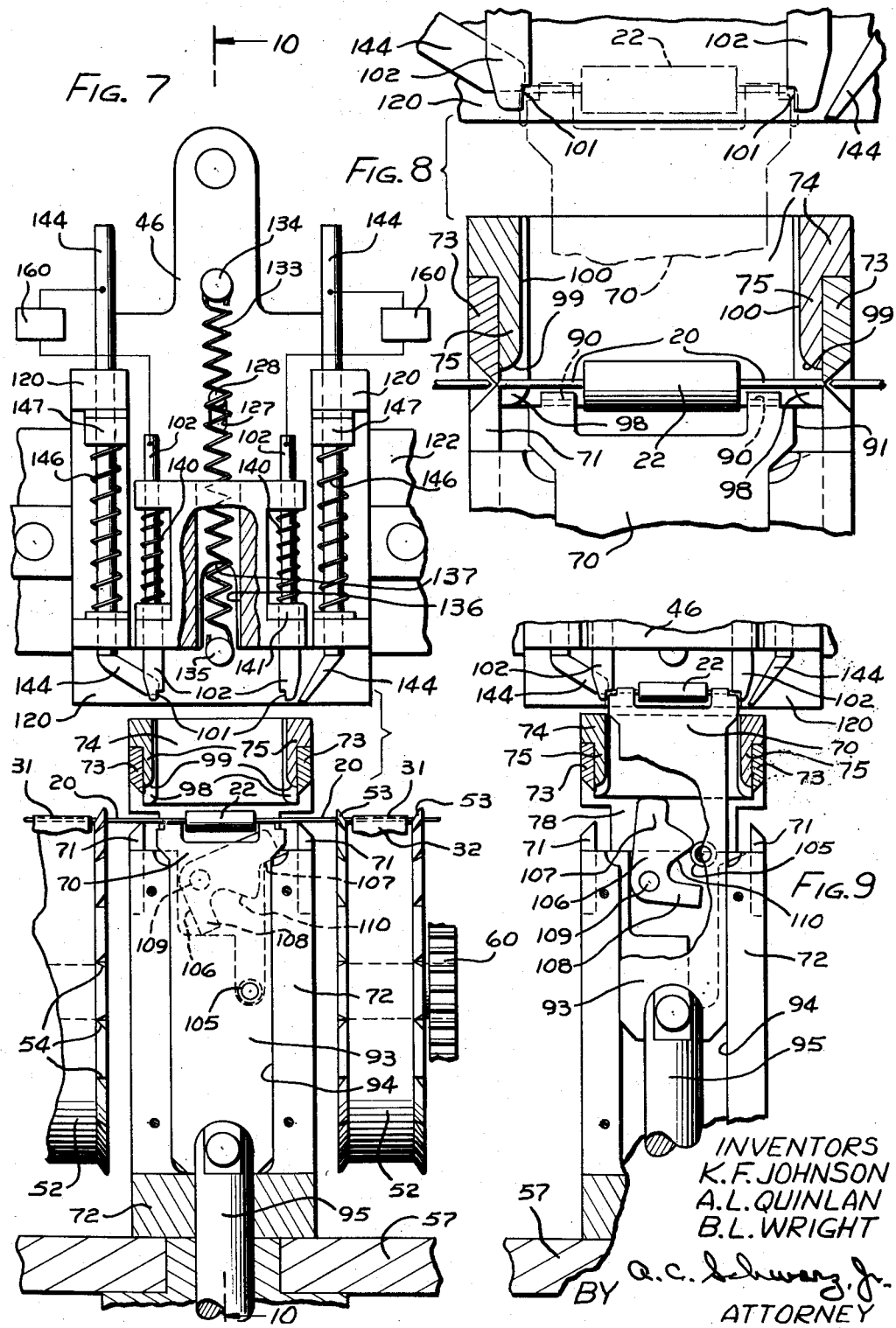
INVENTORS
K.F. JOHNSON
A.L. QUINLAN
B.L. WRIGHT
BY Q.C. Schwarz Jr.
ATTORNEY

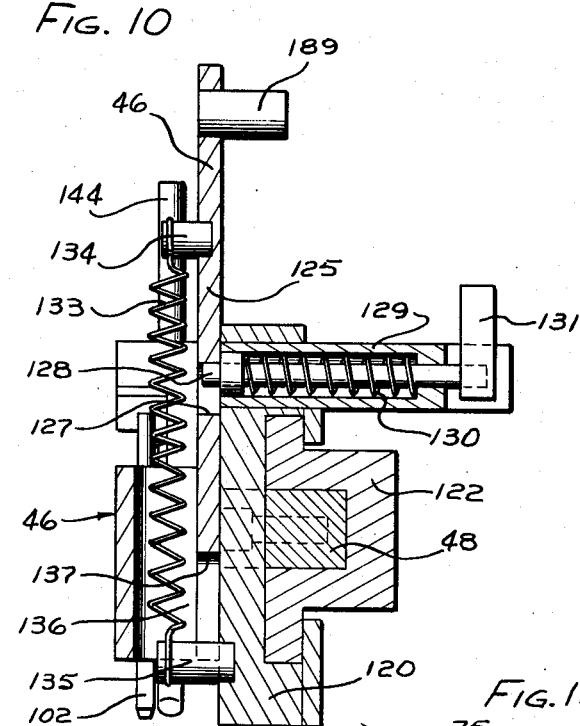
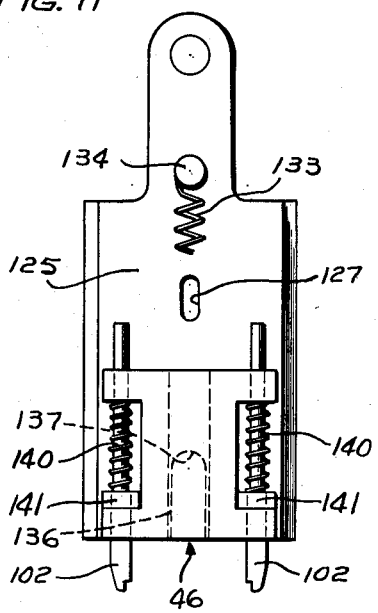
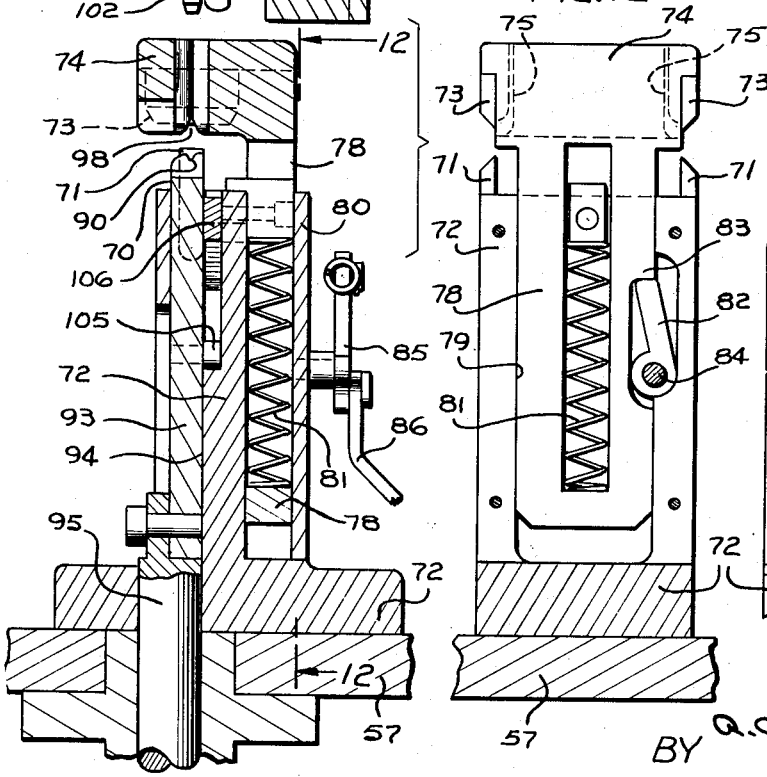
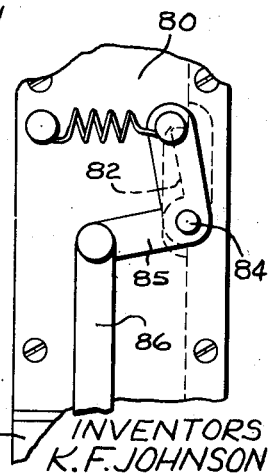

March 12, 1963  K. F. JOHNSON ETAL  3,081,396
APPARATUS FOR FORMING AND WELDING
Filed Jan. 9, 1961  9 Sheets-Sheet 8

INVENTORS
K.F. JOHNSON
A.L. QUINLAN
B.L. WRIGHT
BY a.c. Schwarz j.
ATTORNEY

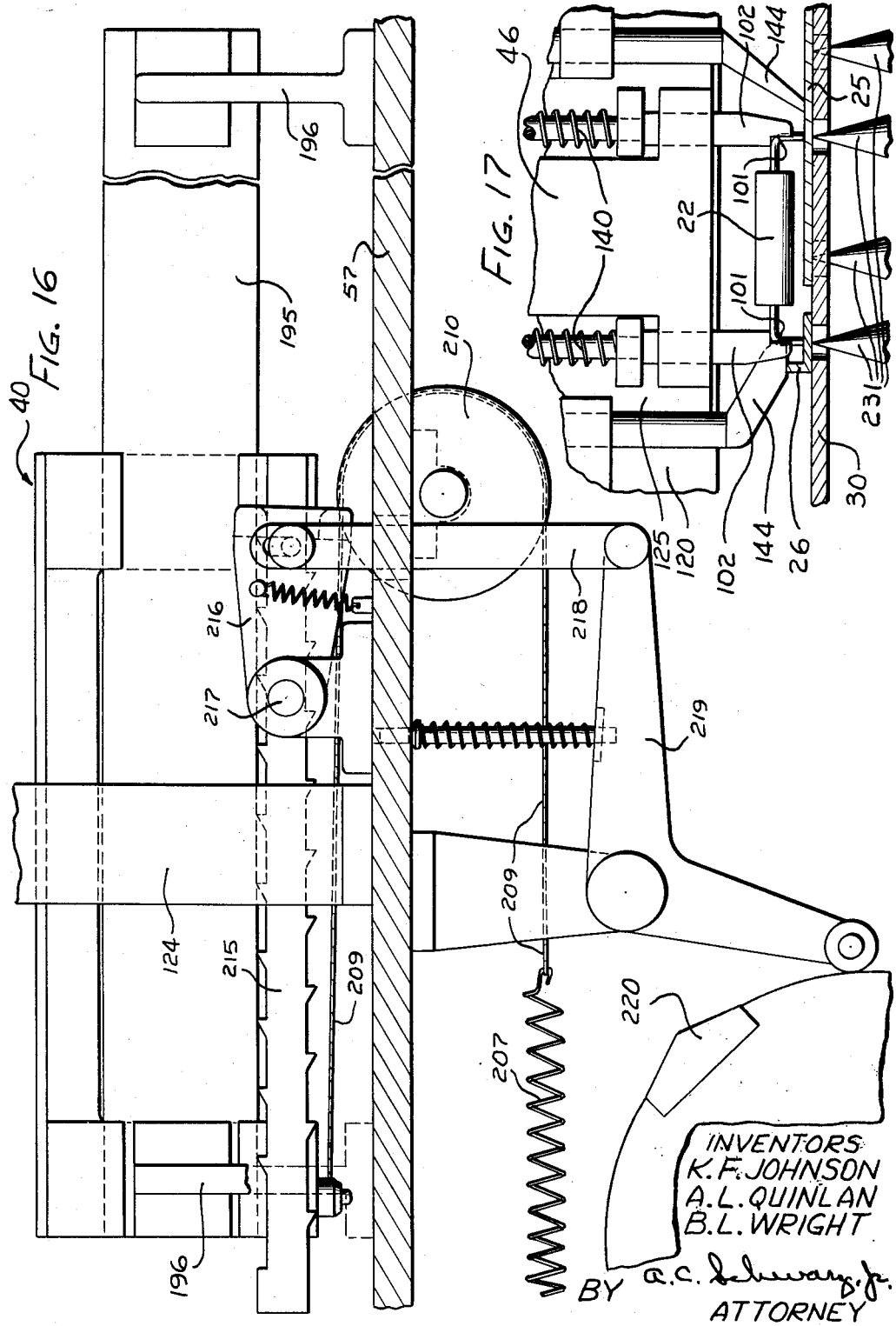

United States Patent Office 3,081,396
Patented Mar. 12, 1963

3,081,396
APPARATUS FOR FORMING AND WELDING
Kenneth F. Johnson, Oak Lawn, Amos L. Quinlan, La Grange Park, and Ben L. Wright, Chicago, Ill., assignors to Western Electric Company, Incorporated, a corporation of New York
Filed Jan. 9, 1961, Ser. No. 81,442
15 Claims. (Cl. 219—79)

This invention relates to apparatus for forming and welding, and more particularly to apparatus for shearing and forming the leads of electrical components and percussively welding them to circuit boards.

An object of the present invention is to provide an improved apparatus for forming and welding.

Another object of the invention is to provide an improved apparatus for forming parts and welding them onto articles.

A further object of the invention is the provision in a welding apparatus of a plurality of welding heads and mechanism for actuating the welding heads to expedite the loading of parts thereinto and the welding of the parts to an article.

Another object of the invention is to provide an effective mechanism for shearing and forming the leads of electrical components and transferring the components to a welding head.

With these and other objects in mind, the invention contemplates the provision of a carrier movable along a predetermined path to a pair of spaced loading stations and a welding station intermediate thereof. The carrier has a pair of welding heads mounted thereon and is movable in one direction to one position with the first welding head at the first loading station and with the second welding head at the welding station in a predetermined relation to a wiring board mounted on a carriage at the welding station, and the carrier is movable in the opposite direction to another position with the second welding head at the second loading station and the first welding head at the welding station in a predetermined different relation to the wiring board.

Mechanism is provided at each of the loading stations for intermittently feeding strings of electrical components, shearing components from the strings, bending the end portions of the component transversely, and transferring the components to the welding heads. The welding heads and the wiring board are connected to a source of welding potential, and mechanism is provided for moving the welding heads individually at the welding station toward the wiring board to carry the components into percussive engagement with the wiring board and effect the percussive welding of the components thereto. On completion of the welding of the components from both of the welding heads onto the wiring board, the carriage is indexed and the cycle of operation is repeated.

Other objects, advantages and novel aspects of the invention will become apparent upon consideration of the following detailed description, in conjunction with the accompanying drawings, in which:

FIG. 2 is a fragmentary plan view of a circuit board of the type fabricated in the present apparatus and showing some of the components welded thereto;

Figure 1:
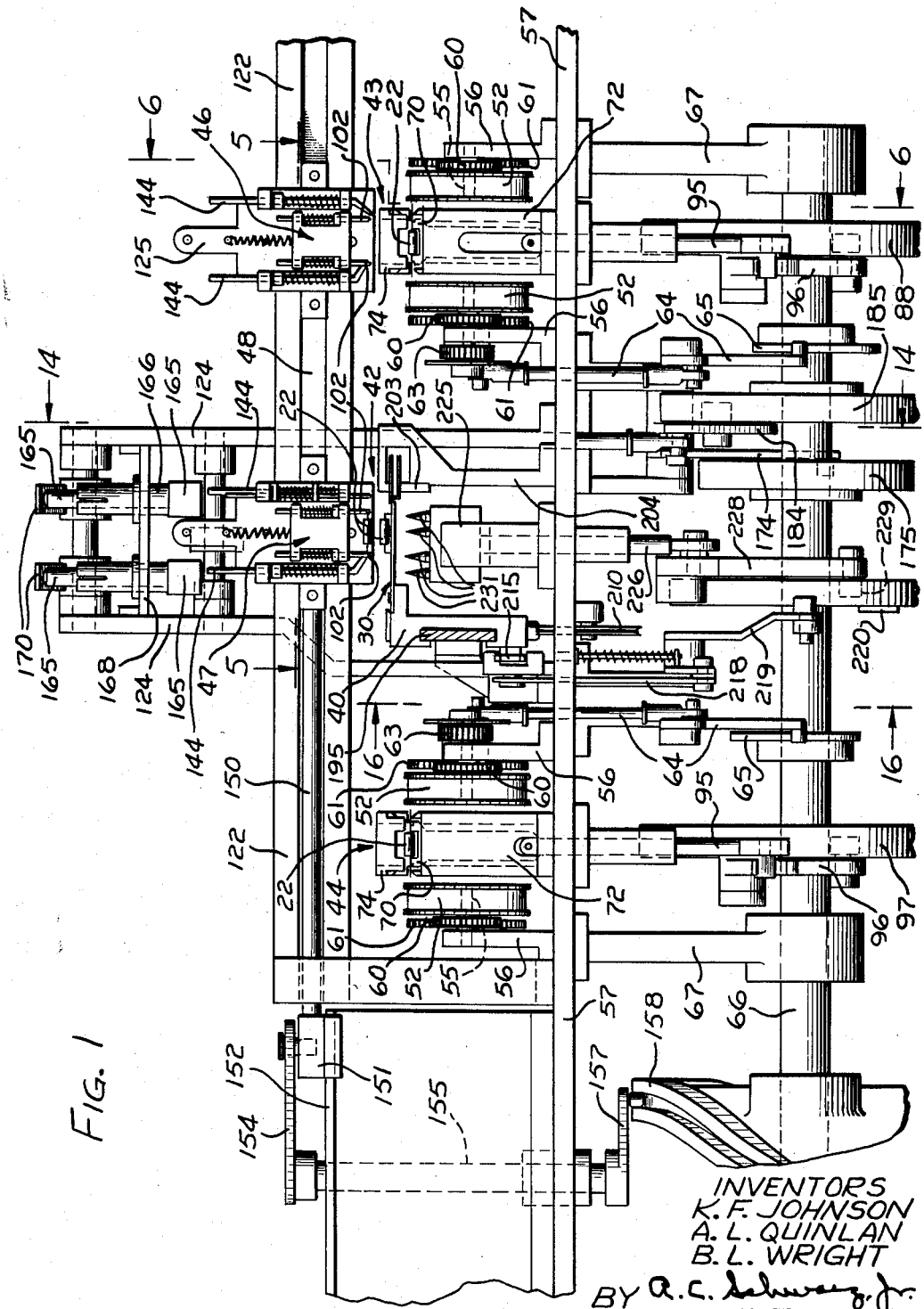
FIG. 1 is a front elevational view of the apparatus embodying the present invention.
Figure 14:
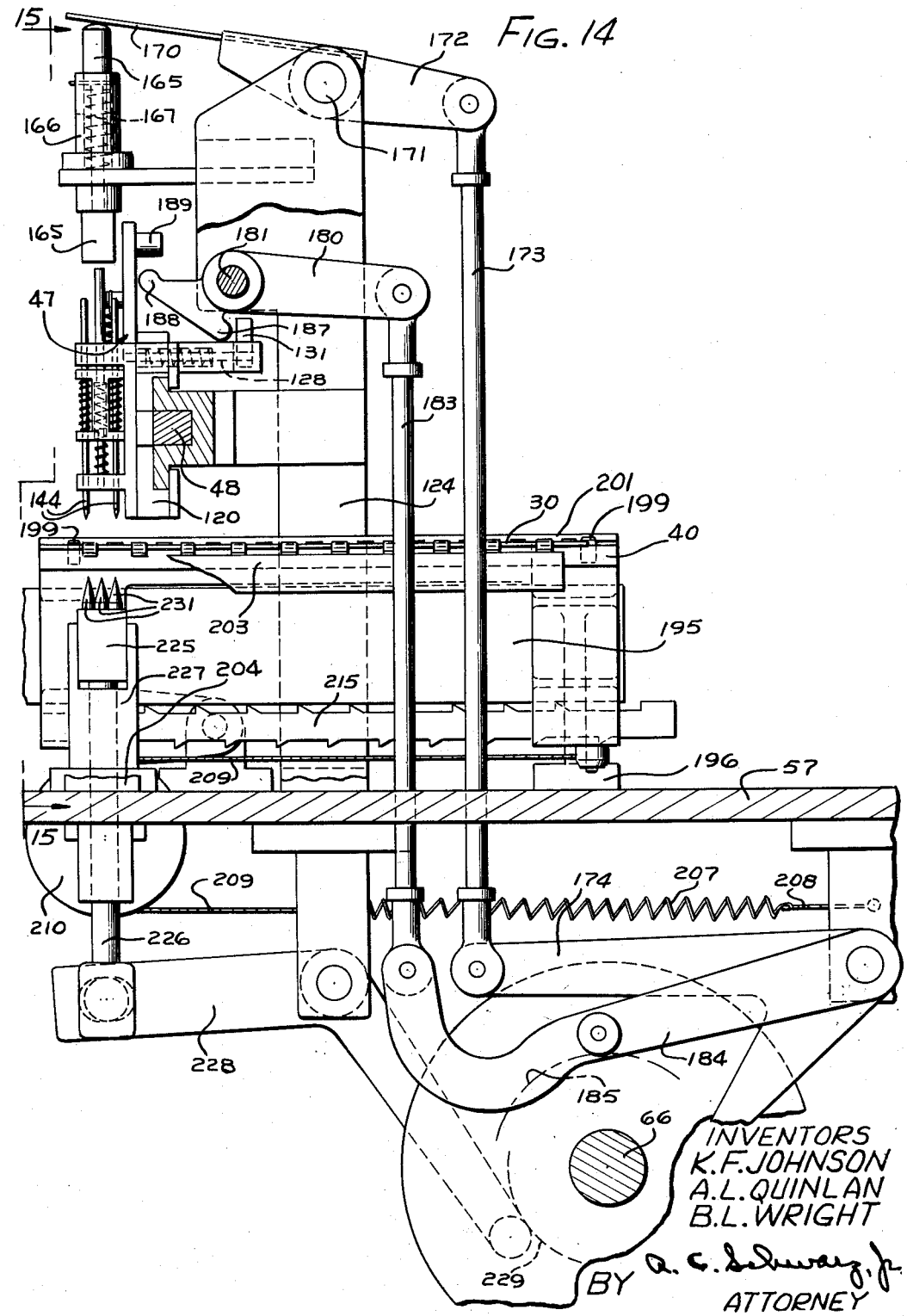
Figure 15:
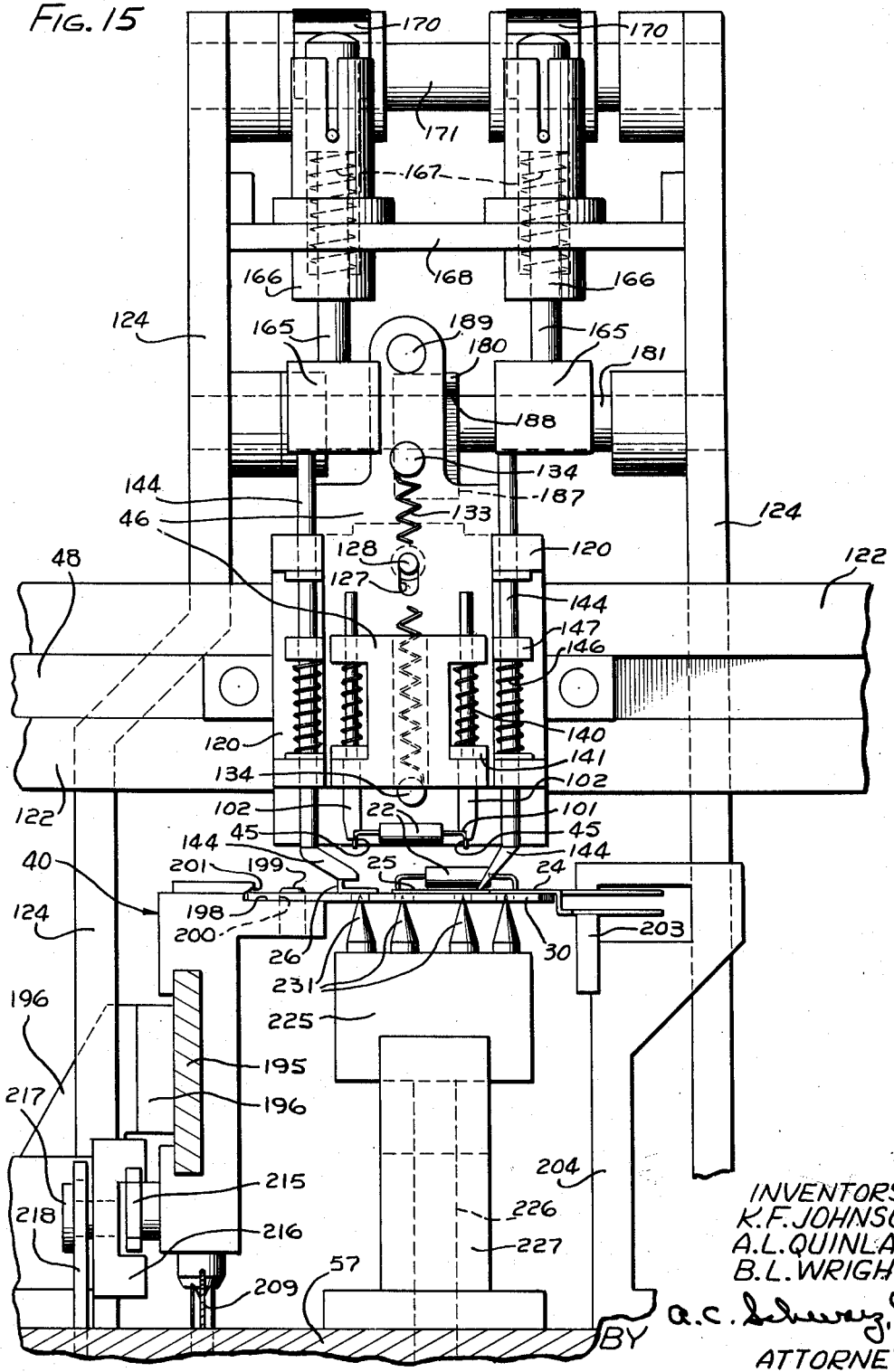

FIG. 3 in an enlarged end elevational view of the circuit board shown in FIG. 2;

FIG. 4 is a fragmentary view of a string of the components;

FIG. 5 is an enlarged fragmentary horizontal sectional view of the apparatus taken on line 5—5 of FIG. 1;

FIG. 6 is a vertical sectional view of the apparatus taken on line 6—6 of FIG. 1;

FIG. 7 is an enlarged fragmentary front elevational sectional view of one of the component forming and loading stations taken on line 7—7 of FIG. 6 and showing a component in position to be sheared and formed;

FIG. 8 is an enlarged fragmentary vertical sectional view of the lead shearing and forming mechanism with the leads of the component being sheared;

FIG. 9 is a fragmentary vertical sectional view of a portion of the mechanism shown in FIG. 7 with parts thereof in different positions and with the formed component being transferred to a welding head of the apparatus;

FIG. 10 is a fragmentary vertical cross sectional view of the mechanism at one of the component forming stations taken on line 10—10 of FIG. 7;

FIG. 11 is a front view of one of the welding heads;

FIG. 12 is a fragmentary rear elevational sectional view of the lead shearing mechanism of the apparatus taken on line 12—12 of FIG. 10;

FIG. 13 is a rear view of a portion of the mechanism shown in FIG. 10;

FIG. 14 is a vertical sectional view through the welding station of the apparatus taken along line 14—14 of FIG. 1;

FIG. 15 is an enlarged fragmentary front elevational sectional view of the apparatus at the welding station taken along line 15—15 of FIG. 14;

FIG. 16 is a fragmentary vertical sectional view of the apparatus taken on the line 16—16 of FIG. 1; and FIG. 17 is a fragmentary enlarged sectional view of one of the welding heads at the welding station showing a component being welded to the circuit board.

Referring to the drawings, particularly FIGS. 2–4, the present apparatus is designed to shear and form the leads 20 of electrical components 22 and weld them to terminals 24, 25 and 26 on an insulated panel 28 of a circuit board 30. The electrical components are supplied in strings 31 (FIG. 4) and are supported in parallel and spaced relation to each other with the end portion of the leads 20 secured between pairs of adhesive tapes 32. From an inspection of FIG. 2, it will be seen that the terminals 24, 25 and 26 are of various configurations and are secured to the dielectric panel 28 in predetermined spaced relation to one another and that the components 22 are mounted on the circuit board 30 in diverse and close relation to one another with some of the components electrically connected to terminals 24 and 25 and some connected to terminals 25 and 26.

Generally, the apparatus comprises a carriage 40 (FIG. 1) for supporting a wiring board 30 in a predetermined position at welding station 42 for the welding of the components 22 to the terminals 24—26. The apparatus also includes a first component forming and loading station 43 and a second component forming and loading station 44. At each of these loading stations mechanism is provided for intermittently feeding a string 31 of components, shearing the components from the string, forming the leads of the components to provide laterally directed parallel end portions 45 (FIGS. 3, 8 and 9) for welding onto the terminals of the board 30, and for transferring the components to two welding heads 46 and 47 mounted in spaced relation to each other on a carrier 48. The components 22 are sheared and formed one at a time at station 43 and two at a time at station 44.

Mechanism is provided for reciprocating the carrier 48 between two positions, in one of which the first welding head 46 is at the first station 43 (FIG. 1) for receiving a component 22 and the second welding head 47 with two components 22 therein is at the welding station 42. In the other position of the carriage, the second welding head 47 is at the second station 44 for receiving a pair of components and the first welding head 46 is at the welding station 42 aligned with predetermined terminals 25, 26 on the wiring board 30. Mechanism is provided for electrically connecting the selected terminals and the welding head at the welding station to a source of welding power and for effecting the movement of the welding head toward the wiring board and the percussive welding of the component to selected conductors during which operation a component is being formed and transferred to the other welding head at one of the stations 43 and 44.

Considering the apparatus in more detail, the mechanisms at the stations 43 and 44 are substantially the same for intermittently feeding strings 31 of components 22, shearing the individual components from the strings, bending the ends of the leads 20, and transferring the components to the welding heads 46 and 47. The significant difference between the mechanisms is that at station 43 only a single component is processed for welding onto the terminals 25 and 26, but at station 44 two components are processed for simultaneous welding onto terminals 24 and 25 as indicated hereinabove. The mechanism of only one station will be described.

The string 31 of components is intermittently advanced by a pair of feed rolls 52 (FIGS. 1, 5 and 6) which are provided with cylindrical surfaces for supporting the tapes 32 thereon and which are provided with flanges 53 for centering the tapes 32 therebetween and thereby locating the component longitudinally in a predetermined position at station 44. The straight leads 20 of the components fit in notches 54 in the flanges 53. The feed wheels 52 are rotatably mounted on stub shafts 55 fixed to supports 56 on a horizontal frame plate 57 of the apparatus. Gears 60 fixed to the feed wheels 52 mesh with drive gears 61 fixed to a drive shaft 62 which is journaled in the supports 56. The shaft 62 is actuated intermittently through a pawl and ratchet device 63 and linkage 64 (FIG. 6) from a cam 65 on a cam shaft 66 for imparting intermittent movement to the feed wheels 52. The cam shaft 66 is rotatably supported in suitable frame bearing brackets 67 depending from the horizontal frame plate 57 and is driven by a suitable drive (not shown).

Successive components 22 are advanced by the feed wheels 52 to a predetermined position at the upper portion thereof above a vertically movable forming punch 70 (FIGS. 7–9) and with the leads 20 of the components disposed above a pair of stationary shear blades 71 secured to a stationary hollow support 72 on the horizontal frame plate 57. The stationary shear blades 71 cooperate with a pair of movable shear blades 73 mounted on a movable member 74 disposed above the punch 70 for shearing the leads to a predetermined length. As shown in FIG. 8, the shear blades 71 and 73 are shaped so as to form small tapered ridges on the ends of the leads 20 of the components.

The member 74 supports a pair of upper forming dies 75 (FIGS. 10 and 12) for vertical movement and has a downwardly directed bar 78 slidable in a guideway 79 in the support 72. A cover plate 80 is secured to the support 72 to retain the bar 78 in the guideway 79. A spring 81 disposed in a slot in the bar 78 stresses the member 74 for movement downwardly and a latch 82 engageable with a shoulder 83 on the bar 78 holds the movable member 74 in a normal raised position (FIG. 12). The latch 82 is secured to a pin 84 which is mounted for oscillatory movement on the cover plate 79 and is connected to a lever 85. The lever 85 (FIGS. 6 and 13) is actuated through a link 86 and a cam lever 87 by a cam 88 to release the spring loaded member 74 with the shear blades 73 and effect the shearing of the leads 20.

The severed component 22 is supported by the lower shear blades 71 (FIG. 8) above the forming punch 70 and with the leads 20 of the component disposed in slots 89 in the upper forming dies 75. The forming punch 75 has raised end portions provided with horizontal grooves 90 for receiving the sheared leads 20 and has vertical end surfaces 91 against which the leads 20 are bent to form the transverse parallel end portions 45. A shank 93 on the forming punch 70 is guided for vertical movement in a guideway 94 in the support 72 and is actuated through a rod 95 and a lever 96 by a cam 97 on the cam shaft 66 for effecting the reciprocation of the forming punch in timed relation to the actuation of the feed wheels 52 and the forming dies 75.

During the upward movement of the forming punch 70, the component 22 is carried upwardly thereby between the upper forming dies 75, and the projecting ends of the leads 20 engage a pair of forming surfaces 99 on the forming dies 75 and are bent downwardly thereby against the end surfaces 91 of the punch to form the downwardly directed lead portions 45. The lead portions 45 ride in a pair of vertical grooves 100 in the forming dies 75 as continued movement of the punch 70 carries the component 22 upwardly across the forming dies into the welding head 46 and presses the leads 20 into seats 101 on the ends of a pair of electrodes 102 on the welding head.

During the upwardly movement of the forming punch 70, a pin 105 (FIGS. 7 and 9) on the shank 93 of the forming punch actuates a cam 106 to cause it to raise the member 74 with the forming dies 75 and shearing blades 73 a distance sufficient to permit the member 74 to be engaged and locked in its upper position by the latch 82. The cam 106 is in the form of a bell crank having arms 107 and 108 and the am is pivotally mounted for movement about a pin 109 on the support 72. During the upward movement of the forming die, the pin 105 engages a portion 110 of the cam 106 and serves to rock it is a counterclockwise direction as viewed in FIG. 7 to effect the raising of the forming dies 75 and shear blades 73 to the upper position (FIG. 9). As the forming punch 70 recedes the pin 105 engages the arm 108 and rocks the cam 106 in a clockwise direction to disengage it from the movable member 74.

The welding heads 46 and 47 (FIGS. 1, 5–7, 10 and 11) are mounted for vertical sliding movement in guideways on members 120 which are mounted in spaced and fixed relation to each other on the carrier 48 and form a part thereof. The carrier 48 is in the form of a rectangular bar mounted slidably for horizontal movement on a track 122 which is supported by vertical frame members 124 secured to the horizontal frame plate 57. A portion of each of the welding heads 46 and 47 is in the form of a plate 125 which extends upwardly above the track 122 and is provided with an aperture 127 for receiving the end of a latching pin 128. As shown in FIG. 10, the latching pin 128 is slidably mounted in a tubular portion 129 of the carrier member 120 and is urged by a spring 130 into locking engagement with the welding head. An upwardly directed lug 131 is secured to the end of the latching pin 128 by means of which the pin 128 may be retracted to release the welding head for downward movement. Each of the welding heads is stressed for downward movement by a spring 133, one end of which is connected to a pin 134 on the plate 125 of the welding head and the other end of which is connected to a pin 135 fixed to the carrier member 120. The pin 135 fits into a slot 136 in the welding head and serves as a stop which is engageable with a stop surface 137 (FIG. 10) on the welding head to arrest the downward movement of the welding head during the welding operation.

It will be understood that the welding head 46 has one pair of the welding electrodes 102 for receiving and supporting one component and that the welding head 47 has two pairs of electrodes 102 for receiving and supporting a pair of components 22. These electrodes 102 are in the form of rods which are mounted slidably on the welding heads for vertical movement therewith and for limited vertical movement relative thereto. Springs 140 (FIG. 7) stress the electrodes 102 for movement downwardly and collars 141 on the electrodes engage portions of the welding heads for supporting the electrodes in predetermined positions thereon.

Auxiliary electrodes 144 in the form of rods are mounted slidably for vertical movement on the carrier members 120 and have lower extremities adapted to engage selected ones of the conductor plates 24, 25 and 26 during the welding of the components thereto. The auxiliary electrodes 144 are urged upwardly by springs 146 to their normal upper positions in which they are stopped by the engagement of collars 147 on the electrodes with portions of the carrier members 120.

The relation of the welding station 42 and the loading stations 43 and 44 to one another and the relation of the welding heads 46 and 47 on the carrier 48 is such that when the carrier is moved to the right to a first position, as indicated in FIG. 1, with the welding head 46 at the loading station 43 for receiving a component 22, the welding head 47 is located at the welding station 42 in a predetermined position relative to the wiring board 30 so that the ends 45 of the pair of components 22 supported by the welding head 47 are in registration with selected portions of terminals 24 and 25 of the wiring board 30. When the carrier 48 is moved to the left to its second position with the welding head 47 at the loading station 44 for receiving a pair of formed components 22, the welding head 46 is at the welding station 42 in a predetermined position relative to the wiring board 30 and with the lead ends 45 of the single component 22 supported thereby in registration with selected portions of terminals 25 and 26.

A rod 150 (FIGS. 1 and 5) is connected at one end to the carrier 48 and is connected at its other end to a head 151 which is mounted slidably on a track 152 for horizontal movement. The head 151 is pivotally connected through a pin and slot device to one end of a lever 154 which is fixed to a rock shaft 155 mounted for oscillatory movement in suitable bearings on the horizontal frame plate 57. A lever 157 fixed to the lower end of the rock shaft 55 is actuated by a cam 158 on the cam shaft 66 for imparting rocking movement to the shaft 155 to effect the reciprocation of the carrier 48 and the welding heads 46 and 47 through a predetermined stroke and the movement of the welding heads alternately to and from the welding station and the loading stations.

Each of the welding electrodes 102 for welding a lead 20 onto a terminal and the associated auxiliary electrode 144 engageable with the conductor plate are connected by flexible conductors to individual sources of welding power 160 as shown diagrammatically in FIG. 7. At the welding stations 42 mechanism is provided for depressing the auxiliary electrodes 144 into engagement with their respective terminals and mechanism is also provided for withdrawing the latching pin 128 to release the welding head and effect the downward movement thereof and the percussive welding of the leads of the component to the selected terminals.

As shown in FIGS. 1, 14 and 15, the mechanism for lowering the auxiliary electrodes 144 comprises a pair of headed pusher rods 165 mounted slidably for vertical movement in fixed guides 166 and urged to normal upper positions by springs 167. The guides 166 are mounted on a supporting plate 168 secured to vertical frame members 124. Downward movement is imparted to the pusher rods 165 by a pair of levers 170 fixed to a rock shaft 171 supported in the vertical frame members 124. An extension 172 of one of the levers 170 is connected through linkage 173 to a cam lever 174 which is actuated by a cam 175 on the cam shaft 66 (FIG. 1).

The mechanism for retracting the latching pin 128 to effect the release of the welding head comprises a lever 180 which is mounted for rocking movement about a fixed pivot pin 181 and is connected by linkage 183 and a cam lever 184 to a cam 185 on the cam shaft 66 for actuation thereby. The lever 180 has a downwardly directed portion 187 engageable with the upturned end 131 of the latching pin 128 for retracting the latching pin in response to rocking movement of the lever 180 in a counterclockwise direction as viewed in FIG. 14. The lever 180 also has a forwardly projecting portion 188 for engaging a pin 189 on the plate 125 of the welding head for raising the welding head on completion of the welding operation and in response to pivotal movement of the lever 180 in a clockwise direction. As the welding head is raised to its normal upper position, the latching pin 128 is urged forward into latching engagement therewith in the slot 127 to releasably retain the welding head in its upper position as shown in FIG. 10.

The carriage 40 (FIGS. 1, 15 and 16) for supporting the wiring board 30 in the welding station 42, is mounted for horizontal movement on a rail 195 which is supported on brackets 196 on the horizontal frame plate 57. A flat horizontally disposed elongated surface 198 on the carriage 40 engages a marginal portion of the wiring board and pins 199 extending upwardly from the supporting surface 198 engage in apertures 200 (FIG. 2) formed in the wiring board 30 to accurately position the board on the carriage. An overhanging lip 201 on the carrier overlies the edge of the wiring board 30 and prevents upward displacement thereof. A rail 203 mounted on a supporting bracket 204 on the horizontal frame plate 57 engages projecting portions of the terminals 24 of the wiring board 30 and cooperate with the carriage 40 to support the wiring board in horizontal position during successive welding operations.

The carriage 40 is urged for movement along the rail 195 by a spring 207 which is fixedly connected at one end 208 to a portion of the machine and which is connected at its other end to a cable 209. The cable engages a sheave 210 and is attached at its other end to the carriage 40. An escapement mechanism, provided for effecting the step-by-step advance of the holder 40 and the wiring board thereon, includes a toothed ratchet bar 215 (FIG. 16) secured to the carriage 40 and cooperating with an escapement pawl 216 mounted for rocking movement about a fixed pivot 217. The pawl 216 is connected through linkage 218 and a cam lever 219 to a cam 220 on the cam shaft 66 for effecting an indexing movement of the carriage 40 on completion of the welding of components 22 from each of the welding heads 46 and 47.

To aid in supporting the intermediate portion of the wiring board 30 during the welding of successive components 22 thereto a movable supporting head 225 is provided (FIG. 15). The head 225 is mounted on a rod 226 and is guided for vertical movement in a fixed guide 227 on the horizontal frame plate 57. The rod 226 is connected to a lever 228 which is actuated by a cam 229 (FIGS. 1 and 14) on the cam shaft 66 for reciprocating the head 225 into and out of engagement with the wiring board 30. On its upper side the head 225 is provided with a plurality of pointed projections 231 which extend into apertures formed in the panel 28 and engage and support the terminals 24—26 on the wiring board 30 directly below the points at which the leads 20 are welded thereto.

It will be noted that the electrodes 102 are yieldably mounted on the welding heads and carry the leads of the components into percussive engagement with the several terminals 24—26 with the momentum of only the electrodes 102 which is of relatively small magnitude. This avoids any adverse effect due to impact of the leads with the terminals with a substantial excess of force. Also, the leads 45 of the components are brought into engagement with the terminals on the wiring board slightly prior to the completion of the downward stroke of the welding head, resulting in relative movement between the welding head and the electrodes (FIG. 17). This relative movement between the welding head and the electrodes renders the springs 140 effective to press the electrodes 102 downwardly and maintain the leads of the components in engagement with the terminals 24—26 during the cooling of the weld therebetween.

*Operation*

On completion of the welding of the last component onto a wiring board the carriage 40 is indexed causing the apparatus to stop with the welding head 46 at the welding station with no component therein and with the welding head 47 at the loading station 44 with a pair of components 22 therein. The completed wiring board 30 is then removed from the apparatus and another wiring board 30 is applied to the carriage 40, after which the carriage with the wiring board 30 thereon is moved along the rail 195 to a starting position. The apparatus is then started, resulting in the movement of the carrier 48 to the right as viewed in FIG. 1 to carry the welding head 46 into the loading station 43 and to carry the welding head 47 with the pair of components thereon into the welding station 42 with the lead ends 45 of the components 22 in alignment with selected portions of the terminals 24 and 25.

At the loading station 43 a component is positioned by the feed wheels 52 in operative position above the forming punch 70, the latch 82 is withdrawn to effect the downward movement of the upper forming dies 75 and the upper shear blades 73 resulting in the shearing of the leads 20 to a predetermined length and the severance of the component 22 from the string 31. The forming punch 70 is then raised between the forming dies 75 to bend downwardly the end portions 45 of the leads of the component 22 and to transfer the component to the welding head 46.

While the component 22 is being sheared, formed and transferred to the welding head 46 at the station 43, the auxiliary electrodes 144 of the welding head 47 are being depressed by the push rods 165 into engagement with terminals 24 and 25 to connect them to the welding circuit. The latching pin 128 is then retracted by the lever 180 to release ahe welding head 47 and effect the movement of the welding head with the pair of components 20 downwardly toward the wiring board 30 and the percussive welding of the leads 20 to the terminals 24 and 25. The welding head 47 and the electrodes 144 are then raised to their normal upper positions and the welding head is latched therein by the pin 128.

On completion of the welding of the pair of components 22 from the welding head 47 onto the terminals 24 and 25 of the wiring board at the welding station 42 and the forming and transfer of a component 22 to the welding head 46 at the loading station 43, the carrier 48 is moved to the left as viewed in FIG. 1 to carry the empty welding head 47 to the loading station 44 and to move the welding head 46 with the formed component 22 therein to the welding station 42 with the lead ends 45 of the component 22 in alignment with selected portions of the terminals 25 and 26. At the welding station 42 the auxiliary electrodes 144 are depressed into engagement with the terminals 25 and 26 and the latching pin 128 of the welding head 46 is then retracted, thereby releasing the welding head and effecting the percussive welding of the component leads to the selected terminals 25 and 26 of the wiring board 30. Simultaneous therewith, a pair if components 22 at the loading station 44 is being sheared, formed and transferred to the welding head 47.

After the pair of components 22 from the welding head 47 and the component from the welding head 46 have been welded to the wiring board 30, the escapement pawl 216 is actuated to index the carriage 40 and the wiring board 30 one step to advance the next set of terminals on the wiring board 30 into welding position. The cycle of operation is repeated until the required number of components 22 have been welded to the wiring board 30 after which the carriage 40 is again indexed to effect the stopping of the operation of the apparatus.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a welding apparatus having a welding station and a plurality of loading stations, means for supporting an article at the welding station, a plurality of welding heads individual to the loading stations for receiving parts to be welded onto the article, means mounting the welding heads for movement along predetermined paths to the loading stations for the loading of parts thereon and to the welding station and for movement at said welding station transversely of said paths to carry the parts into engagement with the article, means for moving the welding heads to and from the welding station and the loading stations in timed relation to one another, and means for moving the welding heads transversely at the welding station to effect the engagement of the parts with the article.

2. In a welding apparatus having a welding station and a plurality of loading stations, means for supporting an article at the welding station, a plurality of welding heads individual to the loading stations for receiving the parts to be welded onto the article, means for supporting the welding heads for movement along paths to and from the loading stations and the welding station and for movement at said welding station transversely of said paths to carry the parts into engagement with the article, means for moving the welding heads to and from the welding station and the loading stations in timed relation to one another, means at said loading stations for loading the parts onto the welding heads, and means for moving the welding heads transversely at the welding station to effect the percussive engagement of the parts with the article.

3. In an apparatus for welding parts onto an article, a carrier movable along a predetermined path between a pair of stations, a welding head mounted on said carrier for movement therewith and for movement transversely of said path, means for reciprocating said carrier to move said welding head to one of said stations for receiving a part and to move said welding head with the part to the other station, means for supporting an article at said other station, and means for effecting the transverse movement of said welding head at said other station to carry the part into engagement with the article.

4. In an apparatus for welding parts onto an article, a carrier movable along a predetermined path between a pair of stations, a welding head mounted on said carrier for movement therewith and for movement transversely of said path, means for reciprocating said carrier to move said welding head to one of said stations for receiving a part and to move said welding head to the other station, means for supporting an article at said other station, means for connecting the article and the welding head to a source of welding potential, and means operable in timed relation to the movement of said carrier for effecting the transverse movement of said welding head at said other station to carry the part into percussive engagement with the article and effect the welding of the part to the article.

5. An apparatus for welding parts onto articles comprising a carrier movable along a predetermined path to a loading station and to a welding station, a welding head mounted on said carrier for movement therewith and for movement relative thereto transversely of said path, means for reciprocating said carrier to position said welding head alternately in the loading station and in the welding station, means operable in timed relation to the movement of said carrier for loading a part into said welding head at said loading station, means at said welding station for supporting an article, means on said carrier for latching said welding head in a normal position, resilient means for urging said welding head for movement transversely of said path toward the article, means operable in timed relation to the movement of said carrier for releasing said latching means to effect the movement of said welding head at said welding station toward said article and the percussive welding of said part to said article, and means for returning said welding head to the normal position.

6. An apparatus for welding parts onto articles comprising a carrier movable along a predetermined path to a loading station and a welding station, a welding head mounted on said carrier for movement therewith and for movement relative thereto transversely of said path, means for supporting an article at said welding station, means for reciprocating said carrier to position said welding head alternately at the loading station for the loading of a part thereon and at the welding station, resilient means for urging said welding head for movement transversely of said path toward the article, an auxiliary electrode mounted on said carrier adjacent to said welding head for movement with said carrier and for movement relative thereto transversely of said path, said auxiliary electrode and said welding head being connected to opposite sides of a source of welding current, means at said welding station operable in timed relation to said carrier for moving said auxiliary electrode from a retracted position into engagement with the article, resilient means for returning and yieldably maintaining said auxiliary electrode in the retracted position, latching means for retaining said welding head in a normal retracted position on said carrier, resilient means for urging said welding head for movement transversely of said path toward the article, means at said welding station for releasing said latching means to effect the movement of said welding head toward said article and the percussive welding of said part to said article, and means for returning said welding head to said retracted position.

7. In an apparatus for percussively welding a part onto an article, a welding head, means for supporting the welding head for movement along a predetermined path toward an article supported in its path, a part supporting electrode mounted on said welding head for movement therewith and for limited movement relative thereto, a stop on said welding head, resilient means on said welding head for urging said electrode toward the article to a normal position in engagement with said stop, and means for moving said welding head along said path to cause the electrode to carry the part into percussive engagement with the article.

8. In an apparatus of the type described, a carrier movable along a predetermined path to a pair of loading stations and a work station disposed therebetween, means for supporting an article at said work station, a pair of heads capable of receiving parts therein and mounted on said carrier for movement therewith along said path and for movement relative thereto transversely of said path toward the article, means for reciprocating said carriage to move said heads to said loading stations and said work station, said heads and said stations being disposed relative to one another so that when one head is in one of the loading stations the other head is in the work station in a predetermined relation to the article therein and when the other head is in the other loading station said one head is in the work station in a predetermined relation to the article, and means for effecting the transverse movement of said heads at said work station to carry the parts into engagement with the article.

9. In an apparatus for securing parts to an article, a carrier, mounting means for supporting the carrier for movement along a predetermined path, a pair of heads for receiving parts thereon mounted on said carrier in spaced relation to each other for movement therewith along said path and for movement relative thereto transversely of said path, means for moving said carrier to a first position with one of the heads disposed in a work station and the other head disposed in a first loading station and for moving said carrier to a second position with the other head disposed in the work station and said one head disposed in a second loading station, means for supporting an article at the work station, means at said loading stations for loading parts into said heads, and means for effecting the transverse movement of said heads at said work station to carry the parts into percussive engagement with the article.

10. In an apparatus for welding parts to an article, a carrier, mounting means for supporting the carrier for movement along a predetermined path, a pair of welding heads mounted on said carrier in spaced relation to each other for movement therewith along said path and for movement relative thereto transversely of said path, means for moving said carrier to a first position with one of the welding heads disposed in a welding station and the other welding head disposed in a first loading station and for moving said carrier to a second position with the other welding head disposed in the welding station and said one welding head disposed in a second loading station, means for supporting an article at the welding station, electrodes capable of supporting parts thereon mounted on said welding heads for movement therewith and for movement relative thereto in a direction transversely of said path, stop means on said welding head for arresting the movement of said electrodes relative to said welding heads toward said article and for locating said electrodes in predetermined normal positions on said welding heads, resilient means for yieldably maintaining said electrodes in said normal positions in engagement with said stop means, and means for effecting the transverse movement of said welding heads at said welding station to cause the electrodes to carry the parts into percussive engagement with the article.

11. In an apparatus for welding parts to articles the combination of a carrier movable along a predetermined path to a welding station and a pair of article loading stations disposed on opposite sides of the welding station and in predetermined spaced relation thereto, a pair of welding heads mounted on said carrier in spaced relation to each other for movement therewith and for movement relative thereto transversely of said path, means for moving said carrier to one position to locate one of said welding heads in the welding station and the other welding head in one of the loading stations and for moving the carrier to another position to locate the other welding head in the welding station and said one welding head in the other loading station, means at the loading stations operable in timed relation to the movement of said carrier for loading parts into said welding heads, means at said welding station for supporting an article, and means operable in timed relation to the movement of said carrier for effecting the transverse movement of said heads at said welding station to carry the parts into percussive engagement with the article.

12. In an apparatus for welding parts onto an article, a carrier movable along a predetermined path to a pair of loading stations and a welding station disposed therebetween, means for supporting an article at said welding station, a pair of welding heads capable of receiving parts therein mounted on said carrier for movement therewith along said path and for movement relative thereto transversely of said path toward the article, means for reciprocating said carriage to move said welding heads alternately to said loading stations and to said welding station, said welding heads and said stations being disposed relative to one another so that when one welding head is in one of the loading stations the other welding head is in the welding station in a predetermined relation to the article therein and when the other welding head is in the other loading station said one welding head is in the welding station in a predetermined different relation to the article, means for connecting said welding heads and the article to a source of welding potential, and means operable in timed relation to the movement of said carrier for effecting the transverse movement of said welding heads at said welding station to effect the percussive engagement of the parts with the article and the welding of the parts thereto.

13. In an apparatus for welding parts onto an article, a carrier, mounting means for supporting the carrier for movement along a predetermined path, a pair of welding heads mounted on said carrier in spaced relation to each other for movement therewith and for movement relative thereto transversely of said path, means for moving the carrier to a first position with one of the welding heads disposed in a welding station and the other welding head disposed in a first loading station and for moving said carrier to a second position with the other welding head disposed in the welding station and said one welding head disposed at a second loading station, means for supporting an article at the welding station, means for connecting said welding heads and the article to a source of welding potential, means at said loading stations operable in timed relation to the movement of said carrier for loading parts into said welding heads, means on said carrier for moving said welding heads transversely of said path toward the article, and means operable in timed relation to the movement of said carrier for rendering said last named means operative to move said welding heads transversely at said welding station to carry the parts into percussive engagement with the article to effect the welding of the parts thereto.

14. In an apparatus for welding parts onto an article, a carrier, mounting means for supporting the carrier for movement along a predetermined path, a pair of welding heads mounted on said carrier in spaced relation to each other for movement therewith and for movement relative thereto transversely of said path, means for moving the carrier to a first position with one of the welding heads disposed in a predetermined position at a welding station and the other welding head disposed in a first loading station and for moving said carrier to a second position with the other welding head disposed in a predetermined position at the welding station and said one welding head disposed at a second loading station, means at said loading stations operable in timed relation to the movement of said carrier for loading parts into said welding heads, means for supporting an article at the welding station, resilient means on said carrier for urging said welding heads for movement individually transversely of said path toward the article, releasable means on said carrier for holding said welding heads in retracted positions, means operable in timed relation to the movement of said carrier for actuating said releasable means to effect the movement of said welding heads at the welding station toward said article to effect the percussive engagement and the welding of the parts with the article, and means for returning said welding heads to said retracted position.

15. In an apparatus for welding parts onto an article, a carrier movable along a predetermined path to a pair of loading stations and a welding station disposed therebetween, a pair of welding heads mounted on said carrier for movement therewith and for movement relative thereto transversely of said path, said welding heads and said stations being spaced relative to one another so that when either welding head is in the welding station the other welding head is in one of the loading stations, means for supporting an article at said welding station, means for reciprocating said carrier to effect the movement of said welding heads to said loading stations and to said welding station, means at said loading stations operable in timed relation to said carrier for loading parts into said welding heads, resilient means on said carrier for urging said welding heads for movement individually transversely of said path in a direction toward the article, latching means for retaining said welding heads in normal retracted positions on said carrier in spaced relation to the article, auxiliary electrodes mounted on said carrier adjacent to said welding heads for movement with said carrier in a normal position spaced from the article and for movement relative thereto transversely of said path, said auxiliary electrodes and said welding heads being connected to a source of welding potential, means at said welding station operable in timed relation to the movement of said carrier for moving said auxiliary electrodes into engagement with the article, means at said welding station for releasing said latching means to effect the transverse movement of said welding heads individually to carry the parts into percussive engagement with the article to effect the welding of the parts to the article, and means for returning said welding heads to said retracted positions.

References Cited in the file of this patent

UNITED STATES PATENTS

| | | |
|---|---|---|
| 2,713,362 | Stahl | July 19, 1955 |
| 2,777,477 | Zimmerman | Jan. 15, 1957 |
| 2,782,689 | Carlson et al. | Feb. 26, 1957 |
| 2,906,855 | Long | Sept. 29, 1959 |
| 2,942,093 | Kuba | June 21, 1960 |